Figure 1:
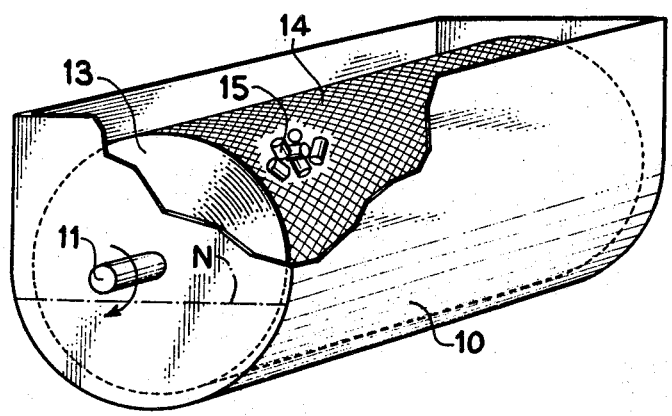

United States Patent

[11] 3,540,589

[72] Inventor Jean-Mathieu Boris
 Paris, France
[21] Appl. No. 755,675
[22] Filed Aug. 27, 1968
[45] Patented Nov. 17, 1970
[73] Assignee Societe Nouvelle Seta S.A.r.l.
 Paris, France
[32] Priority Aug. 30, 1967
[33] Luxembourg
[31] No. 54404

[54] APPARATUS FOR THE PURIFICATION OF POLLUTED WATER
 5 Claims, 2 Drawing Figs.
[52] U.S. Cl. .................................................. 210/150,
 261/83
[51] Int. Cl. .................................................. C02c 5/10
[50] Field of Search ........................................... 261/83;
 210/150, 151

[56] References Cited
UNITED STATES PATENTS
513,536 1/1894 Scowden ..................... 210/150

Primary Examiner—J. L. DeCesare
Attorney—Nolte and Nolte

ABSTRACT: This apparatus is specially adapted for the aerobic bacteriological processing of polluted water and comprises in a substantially horizontal tank a horizontal rotating drum having a perforated external envelope. The rotating drum contains packing elements of the Raschig ring type. These elements are covered with bacteria. During the rotation of the drum which preferably is not completely immersed in the water, the latter flows through the elements and furthermore there is created a good bubbling effect resulting in an improved operation of the apparatus.

Patented Nov. 17, 1970 3,540,589

INVENTOR
Jean-Mathieu Boris
BY Nolte & Nolte
ATTORNEYS

APPARATUS FOR THE PURIFICATION OF POLLUTED WATER

This invention relates to an apparatus for the purification of polluted water especially adapted for the aerobic bacteriological treatment of water.

The aerobic bacteriological processing of water consists in putting in close contact, in the presence of air, the polluted water and the bacteria. Two processes are commonly used: the bacterial filter process and the one using activated muds.

The processing of water with bacterial filters gives good results with a relatively low power consumption but it requires numerous apparatus such as primary decanting tank, filter, secondary decanting tank, digesting apparatus. The construction of a processing plant of this type is expensive and moreover the bacterial filter may clog up thereby generating very unpleasant smell.

The so-called "complete oxidation" processing of water of the type using activated muds permits destroying impurities in solution or in suspension in water by formation of bacteria called "muds". This process also helps destruction of the organic particles of these muds thanks to the endogenic respiration of the bacteria. The construction of a water processing plant of this type is relatively easy and cheap, the breeding of mineralised muds permitting to avoid the use of a digesting apparatus but such plants have a high power consumption. Furthermore they are very sensitive to the frost and require a continuous control and adjustment.

The instant invention relates to an apparatus intended for use in the aerobic bacteriological processing of water which avoids the above-mentioned drawbacks of the prior art installations and permits the obtainment of a plant which is less expensive, consumes less power, does not need any watch or control and is free from clogging.

The apparatus according to the invention is characterized in that it comprises a substantially horizontal tank filled up with the water to be treated and in which rotates a horizontally extending cylindrical drum containing packing elements.

The water is introduced into the tank and is evacuated after having been processed either discontinuously or preferably continuously. The contact of the bacteria attached to the packing elements with the water and with the air is substantially improved thanks to the rotation of the drum which is partially immersed thus bringing the bacteria successively in contact with the air and with the water. Furthermore a small quantity of water is retained by the packing elements while the elements during the rotation of the drum are lifted above the water level in the tank. The water flows in the inside of the packing elements which further improves the oxygenation of the bacteria. A certain quantity of air is also imprisoned in the packing elements immersed in the tank and rises to the surface of the water in the form of bubbles also improving the oxygenation of the water and of the bacteria.

According to a feature of the invention, the packing elements consist of short tubular members of the Raschig ring type.

According to another feature of the invention, the packing elements have a specific gravity which is lower than the one of the water to be treated. Preferably, the total bulk volume of the packing elements is less than the overall internal capacity of the drum.

The use of this type of packing elements is advantageous since they are cheap to obtain and are very convenient to maintain the air bubbles and the water without any risk of clogging because during the rotation of the drum they move freely with respect to one another.

According to a preferred embodiment the tank is open at its top and the drum comprises a peripheral envelope made of wire-netting or perforated metal sheet, the ends of which envelope are closed by solid lateral flanges.

Preferably the drum is divided into longitudinal compartments by radially extending partition walls.

Furthermore, according to still another advantageous feature of the invention, the radially extending partition walls are connected to the peripheral envelope by longitudinal flat elements at an angle of preferably more than 90° of said radial walls.

Thanks to the above features it is possible to substantially improve the performance of the apparatus since the radially extending walls define in combination with the longitudinal flat elements pockets in which are retained the water and the air during the rotation of the drum which improves the "bubbling" effect.

Figure 2:
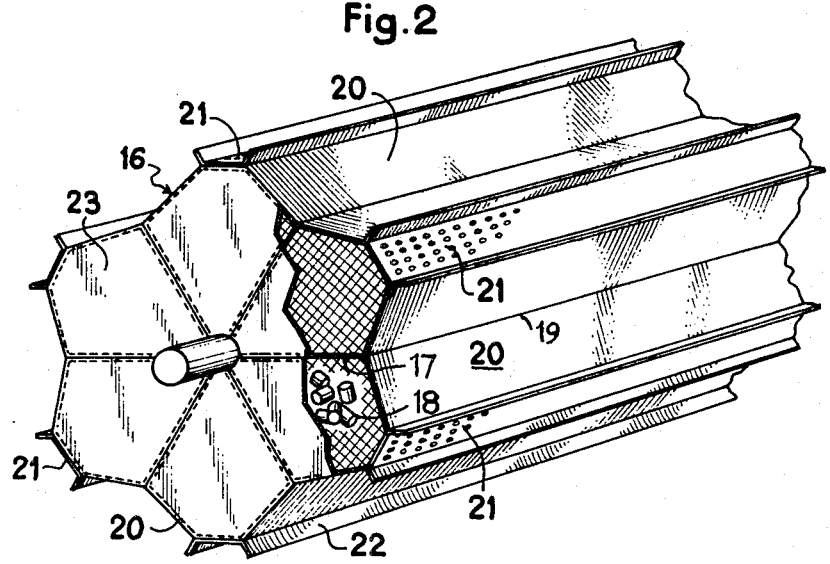

The invention will now be described with reference to the following description which is to be read with the accompanying drawings in which:

FIG. 1 is a diagrammatic perspective view, with parts broken-away; of an apparatus for water processing according to the invention; and FIG. 2 shows diagrammatically, with parts broken-away, the end portion of a rotating horizontal drum according to another embodiment of the invention.

In FIG. 1 reference numeral 10 designates a tank having the shape of a trough the bottom of which is cylindrical. In said tank 10 is rotatably mounted about a horizontal axis 11 a cylindrical drum 12. The means to introduce and evacuate the water, the means to evacuate the surplus of muds as well as the means to drive the drum in rotation are not shown, but may suitably be adaptations of the inlet, outlet and drain means shown in Scowden U.S. Pat. No. 513,536, Jan. 30, 1894.

The cylindrical drum 12 is constituted by the solid lateral flanges 13 the external edges of which are connected by a perforated envelope made in the present example of a wire-netting 14. The inside of the drum is filled up with packing elements 15 consisting preferably of short tubular members of the Raschig ring type. It is also advantageous that the elements 15 be of a material having a specific gravity lower than that of the water (such as copolyethylene, for instance) and that the filling of the packing elements be not complete so that the elements are free to move with respect to one another during the rotation of the drum to avoid the clogging thereof.

The operation of the device which has been briefly described is the following.

The tank is filled up with water to be treated, the sand and stones being removed, and the level N of the water in the tank is preferably located somewhat under the axis of rotation of the drum 12 but this is not critical.

The drum 12 is driven in rotation at a relatively slow speed (generally less than 1 revolution per minute). The packing elements 15 on which are attached the bacteria are thus successively immersed and brought out of the water. The flowing of water through and around these packing elements and the bubbling of air improve substantially the contacts between the bacteria, the water and the air and thus the performance.

It is of course possible to operate with a plurality of drums 12 mounted in series or in parallel in the same tank or in communicating tanks.

The drum represented in FIG. 2 is a modification of the one of FIG. 1. In this example, the drum designated by reference numeral 16 comprises a plurality of longitudinally extending radial walls 17 dividing it into a series of compartments 18 having substantially a triangular cross section and confining packing elements (not referenced). From the external edges 19 of the radial partition walls 17 are extending on both sides longitudinal flat elements 20 which are at an angle of preferably more than 90° with respect to walls 17. Flat elements 20 are separated by a free space covered by a wire-netting or perforated sheet 21. A certain number of elements 20 or all of them are provided at their external edges with rubber or elastomeric sealing ribbon 22. The drum 16 is closed at both ends by solid lateral flanges 23 one only of which is shown on the drawing partially broken away to show the packing material. The drum 16 is used in a tank of the same type as the one of FIG. 1 and its operation is substantially the same as the one of drum 12.

The division of the drum into separated compartments and the provision of elements 20 extending from the radial partition walls 17 results in the formation of pockets of air and the retaining of water during the rotation of the drum causing a large increase of the flow of water and of the bubbling of air which improves the performance of the apparatus. Furthermore the rubber sealing ribbons 22 are scraping the bottom of the tank and avoid the sedimentation of the muds.

I claim:

1. An apparatus intended for use in the aerobic bacteriological processing of polluted water comprising, in a substantially horizontal tank filled with water to be treated, a rotating drum carried by a horizontally extending shaft, means for rotating the drum in slow rotation, said drum being at least partially immersed in the water of said tank and being provided with a perforated peripheral envelope, packing elements contained in said drum and having the bacteria attached to said elements, said elements consisting of short tubular members of the Raschig ring type having a specific gravity lower than that of the water in the tank, and means being provided to circulate the water and evacuate the surplus of bacteria muds, the drum being divided into longitudinal compartments by radially extending partition walls and having longitudinally extending flat elements connected to said walls and lying at an angle of more than 90° with respect to said walls, adjacent flat elements being connected by perforated strips to constitute the peripheral envelope and to retain the packing elements.

2. An apparatus according to claim 1 wherein the total bulk volume of the packing is less than the overall internal capacity of the drum.

3. An apparatus according to claim 1 which includes solid lateral flanges closing the ends of said envelope.

4. An apparatus according to claim 1 wherein the peripheral envelope is made of wire-netting.

5. An apparatus according to claim 1 wherein the peripheral envelope is made of perforated metal sheet.